Jan. 4, 1955  C. HERZOG  2,698,502
CONTACT LOADING FIXTURE
Filed Sept. 21, 1950  2 Sheets-Sheet 1
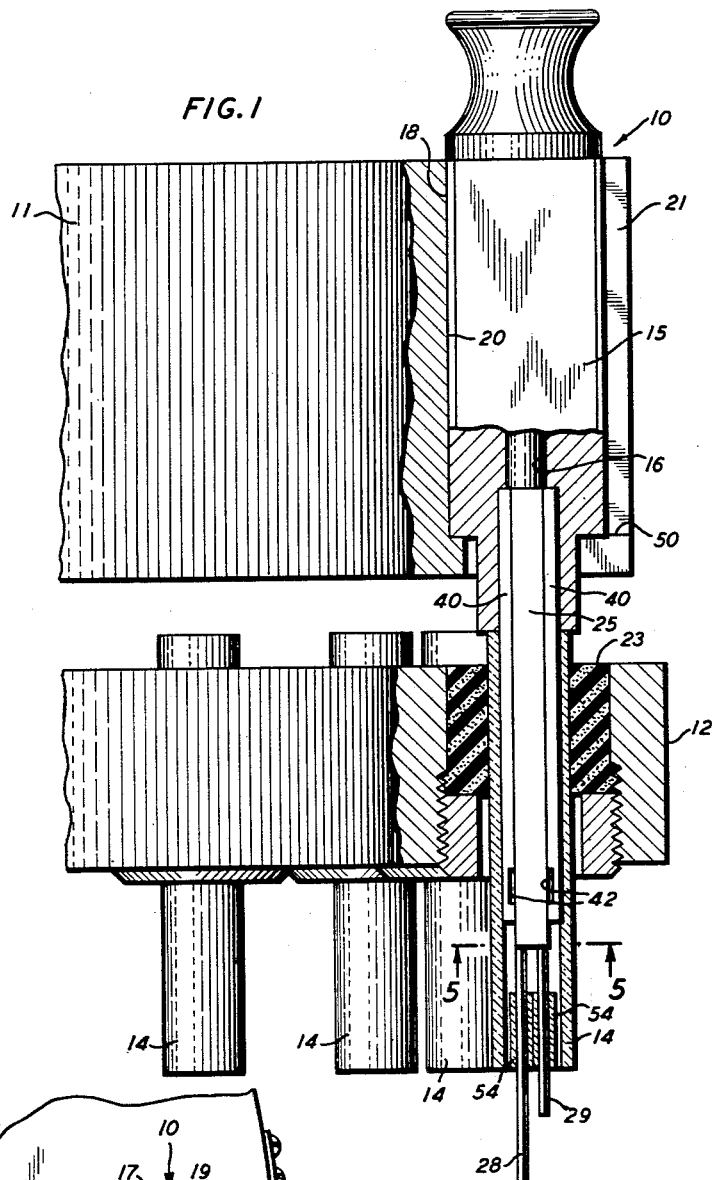
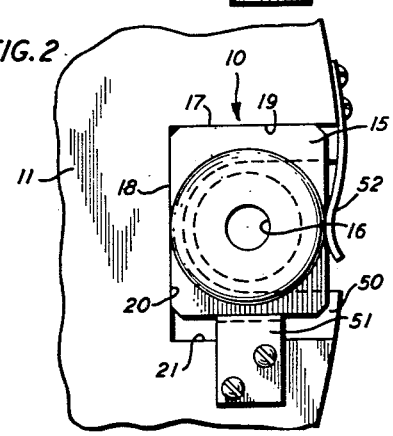
INVENTOR
C. HERZOG
BY
ATTORNEY Jan. 4, 1955 C. HERZOG 2,698,502
CONTACT LOADING FIXTURE
Filed Sept. 21, 1950 2 Sheets-Sheet 2
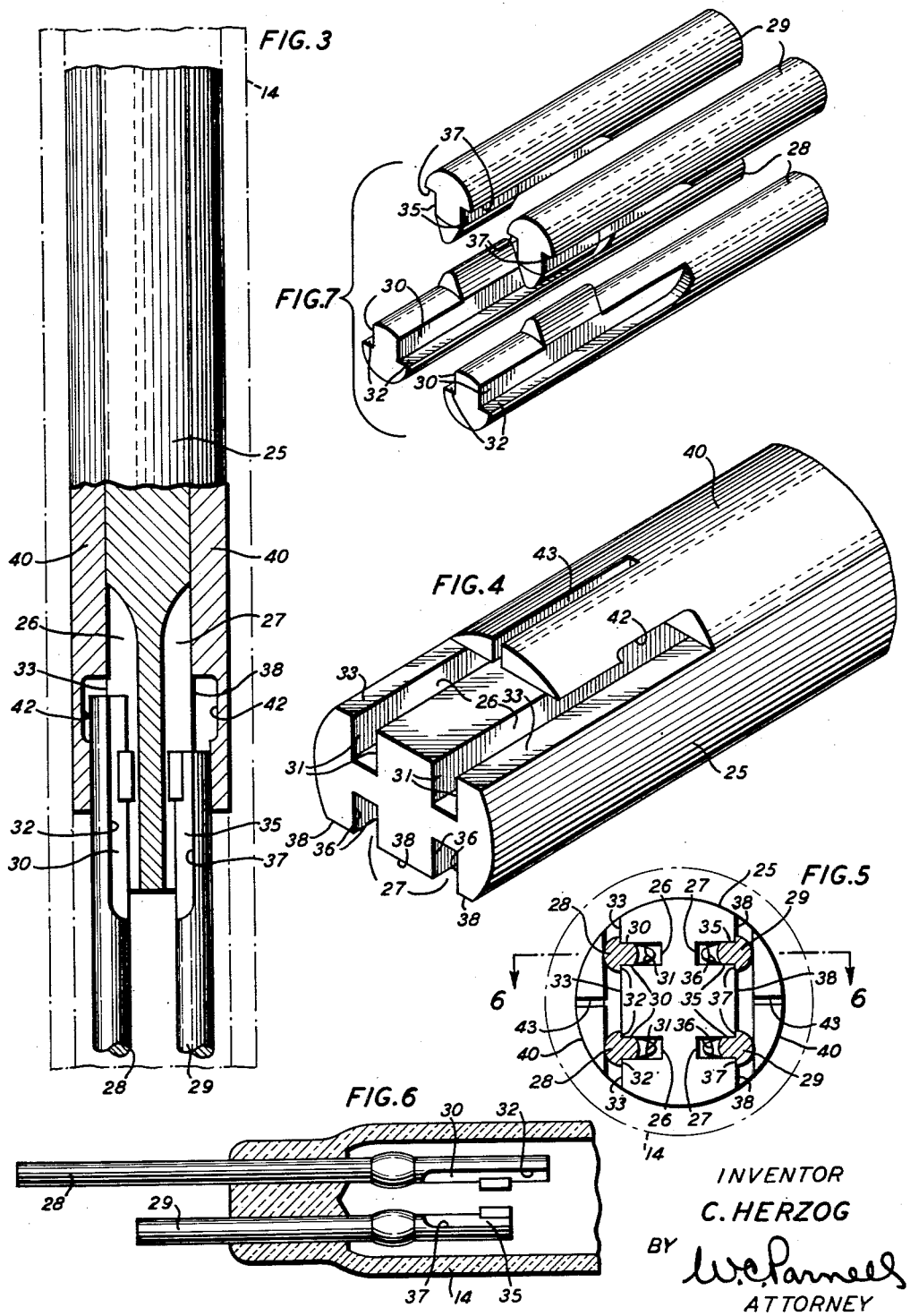
INVENTOR
C. HERZOG
BY
ATTORNEY

United States Patent Office 2,698,502
Patented Jan. 4, 1955

2,698,502

CONTACT LOADING FIXTURE

Carl Herzog, Belleville, N. J., assignor to Western Electric Company, Incorporated, New York, N. Y., a corporation of New York Application September 21, 1950, Serial No. 186,004

1 Claim. (Cl. 49—14)

This invention relates to article locating apparatus and more particularly to apparatus for loading contacts in glass tubes for the manufacture of mercury switches.

In the manufacture of mercury switches for use in the telephone industry, two pairs of contacts are to be located accurately with respect to each other and the center line of a glass tube, and held in this position while the adjacent end of the glass tube is sealed about the contacts. Subsequently, an armature unit to function with the pairs of contacts is sealed in the other end of the glass tube. The efficiency of the mercury switch depends not only upon the accuracy in which the various parts are manufactured individually, but upon the accuracy in which these parts are mounted within the glass tube.

It is the object of the present invention to provide an apparatus which is simple in structure yet highly efficient in accurately locating articles, particularly contacts, within a receptacle or glass tube.

With this and other objects in view, the invention comprises an article locating apparatus including a holder for removably receiving articles at known spaced positions and accurately locating the articles within a receptacle.

In the present embodiment of the invention, a support is recessed for the holder to assure its alignment with a chuck for the glass tube. The portion of the holder to extend into the glass tube when the holder is mounted in the recess includes a central body member with pairs of grooves therein providing reference surfaces to cooperate with reference surfaces of the contacts so that, when the contacts are assembled in the holder and removably held in place by resilient fingers, the contacts will be accurately positioned with respect to each other and with respect to the recess for the holder. The recess for the holder also has reference surfaces corresponding to similar reference surfaces of the holder to assure accurate positioning of the contacts within the glass tube.

Other objects and advantages will be apparent from the following detailed description when considered in conjunction with the accompanying drawings wherein:

Fig. 1 is a fragmentary vertical sectional view of the apparatus illustrating the holder in position with contacts ready to be sealed in one end of a glass tube;

Fig. 2 is a top plan view of the structure shown in Fig. 1;

Fig. 3 is an enlarged fragmentary sectional view of the lower portion of the holder;

Fig. 4 is an enlarged isometric view of the lower portion of the holder;

Fig. 5 is an enlarged horizontal sectional view taken along the line 5—5 of Fig. 1;

Fig. 6 is a fragmentary sectional view of the glass tube with the contacts sealed therein; and Fig. 7 is an enlarged isometric view of the contacts illustrating the various reference surfaces thereof.

Referring now to the drawings, attention is first directed to Figs. 1 and 2 which illustrate the three main parts of the apparatus, the first being the holder 10, the second, the support 11 therefor, and the third, the support 12 for the glass tube 14. The upper portion 15 of the holder 10 is centrally apertured at 16 and is provided with locating or reference surfaces 17 and 18 to engage reference surfaces 19 and 20 of any of a plurality of recesses 21 disposed in the support 11. The term "reference surfaces" is used to imply that, if all other parts of the holder 10 are located accurately with reference to their surfaces 17 and 18 and, if all the other parts of the supports 11 and 12 are located accurately with reference to the surfaces 19 and 20 and, if the surfaces 17—18 and 19—20 are machined to very close limits the accurate assemblly of the parts will be assured. In the present embodiment of the invention, the supports 11 and 12 may be integral with each other and supported for intermittent rotary motion about a given axis (not shown). The supports are fixed in a suitable manner so that they will rotate intermittently in unison so that the center line of the aperture 16 of the holder 10, when disposed in any of the recesses 21, will be in alignment with the center line of its respective chuck 23 in which the glass tube 14 is removably mounted. The chuck 23 may be of any suitable structure capable of holding the glass tube in a given position during the necessary locating and sealing operations.

The holder 10 has a central member 25, of the contour shown particularly in Figs. 4 and 5, fixedly mounted at its upper end in the portion 15 in alignment with the aperture 16. The lower end of the central member 25 has pairs of grooves 26 and 27 for their respective contacts 28 and 29. By viewing Fig. 7, it will be apparent that the contacts 28 and 29 are formed with reference surfaces corresponding to the reference surfaces formed by their respective grooves 26 and 27. For example, contacts 28 have parallel reference surfaces 30 corresponding to the parallel reference surfaces 31 formed by the grooves 26 and other reference surfaces 32 lying in a given plane to engage the surfaces 33 of the member 25. In a similar manner, the parallel reference surfaces 35 of the contacts 29 correspond to the parallel reference surfaces 36 of the grooves 27 while their other reference surfaces 37 lie in a given plane to engage the reference surfaces 38 of the central member 25. Here again the term "reference surfaces" is used. In this instance it describes the angularly positioned surfaces 30—32 and 35—37 formed in pairs in each contact with reference to each other and their center lines so that whenever the contacts are disposed in their respective positions in the holder, they will be known to be positioned accurately with reference to each other and the reference surfaces 17 and 18.

To complete the holder 10, retaining elements 40 are mounted on each side of the central member 25 and have their upper ends embedded in the portion 15 while their lower ends are reduced in thickness as at 42 and bifurcated at 43 to provide individual resilient fingers shown more clearly in Fig. 5 to hold the contacts in place. The central member 25 and the upper portions of the retaining elements complete a structure circular in cross-section and smaller in diameter than the inner diameter of the glass tube 14.

Considering now the function of the apparatus, let it be assumed that the glass tubes are fed individually into their respective chucks 23 and located at predetermined positions therein with respect to the recess 21. The particular locating means for the holder 10 in addition to the reference surfaces 19 and 20 of the recess 21 includes a shoulder 50 upon which the holder rests. Furthermore, suitable means such as springs 51 and 52 are provided to normally urge the holder, particularly the reference surfaces 17 and 18 thereof, into close engagement with the reference surfaces 19 and 20 of the recess.

In preparing the holder, the operator need only select the pairs of contacts and place them within their respective recesses 26 and 27. The contacts can be placed only in their proper positions within the holder, that is, with their reference surfaces positioned in engagement with the respective reference surfaces of the holder or the central portion 25 thereof. The holder therefore accurately locates the contacts with respect to each other and the reference surfaces 17 and 18 before they are placed within the glass tube 14. The operator then need only place the holder in the recess 21 so that the contacts extend downwardly into the glass tube. Through assurance of the accurate location of the holder in the support 11 with respect to the center line of the tube 14 and with the contacts maintained in accurate spaced relationship, they will be in known spaced positions with respect to the center line of the tube when the lower end of the tube is fused about the contacts. In this manner and through the aid of this apparatus, the articles, namely the contacts 28 and 29, are accurately mounted in and made a part of the switch structure with the pairs of contacts parallel with each other and the center line of the tube and spaced known distances from their other pair of contacts. To assist in the sealing of the glass tube about the contacts, smaller glass tubes known as glass heads 54 are placed on the contacts before mounting in the holder.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A fixture for loading contacts, having inner end portions with parallel locating surfaces disposed at given angles with respect to other locating surfaces and outer end portions, in one end of a tube for the sealing of the contacts intermediate their end portions in the end of the tube, the fixture comprising a support for the tube, a holder having a reference surface adjacent one end thereof, the other end being formed with grooves in spaced positions to partially receive the contacts and having parallel and other locating surfaces to be engaged by their respective locating surfaces of their contacts, resilient fingers carried by the holder to frictionally hold the inner ends of the contacts in their respective grooves, and a support recessed to removably receive the holder and having a reference surface positioned with respect to the support for the tube to be engaged by the reference surface of the holder during relative movement of the supports toward and away from each other to first cause the holder to extend into one end of the tube to hold the contacts while they are sealed in the other end of the tube and then cause the holder to move free of the sealed contacts and the tube.

References Cited in the file of this patent

UNITED STATES PATENTS

| | | |
|---|---|---|
| 2,114,844 | Krause | Apr. 19, 1938 |
| 2,174,853 | Bowie | Oct. 3, 1939 |
| 2,272,882 | Brown | Feb. 10, 1942 |
| 2,364,689 | Brooks | Dec. 12, 1944 |
| 2,387,083 | McCain | Oct. 16, 1945 |
| 2,402,029 | Dinnick et al. | June 11, 1946 |
| 2,411,184 | Beggs | Nov. 19, 1946 |
| 2,523,903 | Ellwood | Sept. 26, 1950 |
| 2,527,150 | Quinlan | Oct. 24, 1950 |
| 2,536,677 | Brunner et al. | Jan. 2, 1951 |
| 2,553,749 | Clark et al. | May 22, 1951 |